United States Patent [19]

Snelson

[11] 4,099,339

[45] Jul. 11, 1978

[54] MODEL FOR ATOMIC FORMS

[76] Inventor: Kenneth Snelson, 140 Sullivan St., New York, N.Y. 10012

[21] Appl. No.: 773,552

[22] Filed: Mar. 2, 1977

[51] Int. Cl.² .............................................. G09B 23/26
[52] U.S. Cl. ...................................................... 35/18 A
[58] Field of Search .......................... 35/7 A, 18 A, 34

[56] References Cited

U.S. PATENT DOCUMENTS

| 3,091,870 | 6/1963 | Sangster | 35/18 A |
| 3,276,148 | 10/1966 | Snelson | 35/18 A |
| 3,928,921 | 12/1975 | Gurman | 35/7 A |

FOREIGN PATENT DOCUMENTS

| 750,514 | 6/1956 | United Kingdom | 35/18 A |

OTHER PUBLICATIONS

A. J. Gordon, "Atomic & Molecular Models", J. Chem. Educ. 47, 30–32 (1970).
L. Pauling et al., "Introduction to Quantum Mechanics", (McGraw-Hill, New York, 1935), pp. 36–45.
K. Snelson, "A Design for the Atom," Industrial Design, Feb. 1963.
A. Walton, "The Use of Models in Stereochemistry," Progress in Stereochemistry, 4, 335–375 (1968).

Primary Examiner—Harland S. Skogquist
Attorney, Agent, or Firm—Pennie & Edmonds

[57] ABSTRACT

The present invention relates to a model for atomic forms which includes pairs of ring magnets for representing pairs of electrons in an atom or molecule.

8 Claims, 8 Drawing Figures

FIG. 5
FIG. 6
FIG. 7
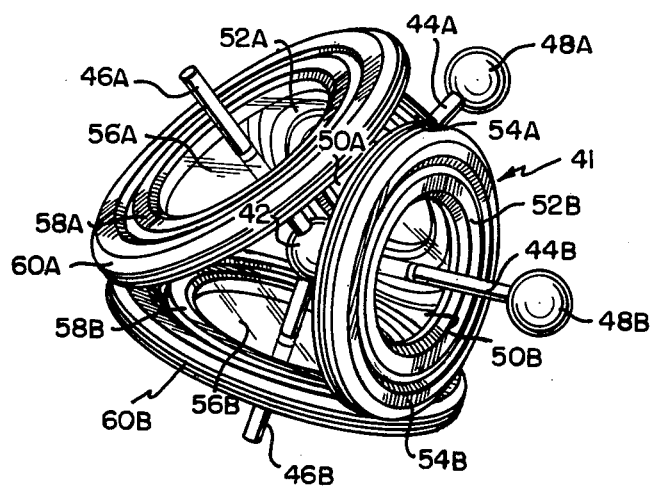
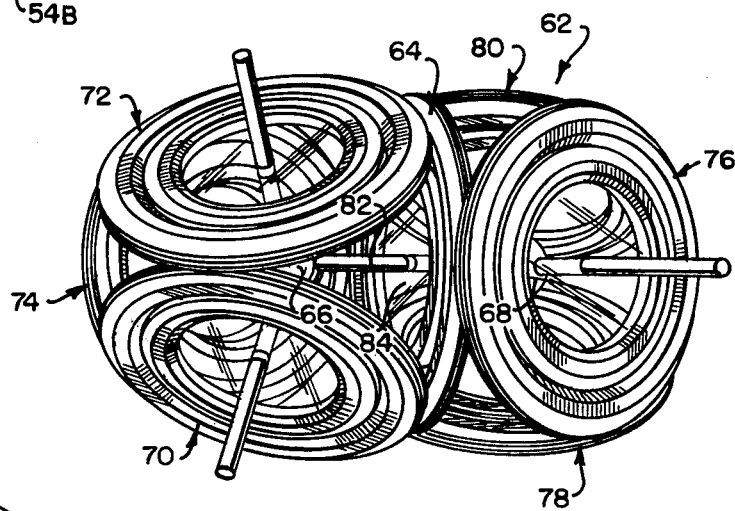
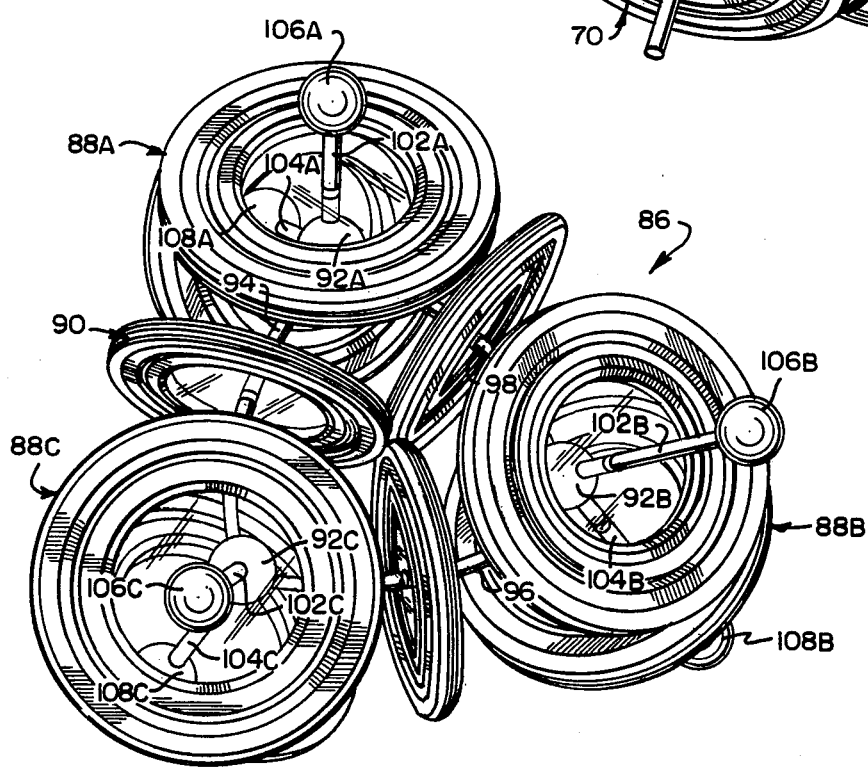

MODEL FOR ATOMIC FORMS

BACKGROUND OF THE INVENTION

A. Field of the Invention

The present invention relates to a model for atomic forms such as single atoms and polyatomic molecules. Such models are useful as educational or research devices.

B. Description of the Prior Art

Atoms and molecules are believed to be made up of electrically-charged electrons and nuclei. A number of theories have been advanced to explain the physical and chemical properties of atoms and molecules in terms of the positions and orbits of these atomic constituents. A theory widely believed to account for atomic and molecular structure, quantum mechanics, described atoms as having a positively charged nucleus generally surrounded by electronic orbitals. It is the view of quantum mechanics that particles such as electrons have wave-like properties and that the electronic orbitals of atoms correspond to standing waves set up by the electrons about the atomic nucleus. Each electronic orbital has a specific geometry and is able to accommodate at most only two electrons. Thus an atom or molecule having more than two electrons will necessarily have more than one electronic orbital.

The electronic orbitals of the hydrogen atom, the simplest atom, are labeled in quantum mechanics by three numbers designated $n$, $l$, and $m$. The principal quantum number $n$ specifies the energy of the orbital and can take on the values of 1, 2, 3, 4, ... . The azimuthal quantum number $l$ specifies the total angular momentum of the orbital and takes on the values of 0, 1, 2, ...$(n-1)$. The magnetic quantum number $m$ specifies the component of the angular momentum along a specified direction and takes on the values 0, $\pm 1$, $\pm 2$, ... $\pm l$.

As noted above, each of these orbitals can include up to two electrons. However, when two electrons occupy a single orbital, their spin magnetic moments must be antiparallel in orientation. A fourth quantum number, termed the spin quantum number and denoted $m_s$, specifies the orientation of the spin electron moment of an electron. The spin quantum number takes on only two values, $\pm \frac{1}{2}$. When two electrons occupy the same orbital, the spin quantum number of one must be $+\frac{1}{2}$ and the other $-\frac{1}{2}$.

Although quantum mechanics has been relatively successful as a mathematical theory for calculating physical and chemical properties of atoms and molecules, it presents contradictions which make it difficult to understand how electrons in rapid motion are able to form structural systems in three-dimensional space. For example, in quantum mechanics the strength of materials in compression is generally viewed to be caused by a relative impenetrability of one atom or molecule to another which results from an electrical-barrier property of the matter-waves of the electrons. However, within a single atom or molecule having a plurality of electrons, the matter-waves of the electrons are viewed as sharing the common space around the nucleus, interpenetrating one another much as light waves pass through one another without obstruction. The electrical-barrier property is thus apparently not present within atoms or molecules, which seems to contradict the observed compressive strength of materials.

Moreover, it is difficult, if not impossible, to construct three-dimensional models which accurately depict for different atoms and molecules the electronic structures predicated by quantum mechanics. This problem arises because the electronic orbitals of quantum mechanics, as a result of their wave-like properties, are viewed as being able to interpenetrate one another, as noted above. It is, of course, not possible to fabricate solid models of such orbitals individually and assemble them to construct an atom or molecule, since the orbital shapes would interfere with one another rather than interpenetrate.

The question of the precise geometry of the orbits of electrons in nature has been mooted by Heisenberg's principle of uncertainty, according to which all pictures of the performance of atomic electrons must be to a certain extent hypothetical, since it is impossible to view such events directly. The present invention attributes to atomic electrons matter-wave qualities useful for them to be understood as unit structural ingredients for pairing with other electrons and for the formation of covalent bonds.

In my earlier United States Pat. No. 3,276,148 I disclose a model for atomic forms which represented the electronic structure of atoms and molecules with magnetic rings or discs. The orbitals of my earlier model, as well as the model disclosed below, can be occupied by only one electron, as opposed to the orbitals of quantum mechanics which can be occupied by one or two electrons. The circular electronic orbitals of the U.S. Pat. No. 3,276,148 patent illustrate many of the symmetries of the orbitals predicted by quantum mechanics, but are not interpenetrating. Thus a model of an atomic form can be constructed by disposing rings or discs about a model atomic nucleus. Furthermore, as discussed in the U.S. Pat. No. 3,276,148 patent, by making the rings and discs magnetic, certain properties of atoms can be readily demonstrated. However, the model atomic orbitals disclosed in my earlier patent did not provide for demonstrating the effects of electron pairing, an important phenomena responsible for chemical bonding in many molecules.

I have discovered a model for atomic forms which illustrates many of the structural and magnetic features of atoms and molecules, including the effects of electron pairing.

SUMMARY OF THE INVENION

The present invention relates to a model for atomic forms which includes a plurality of pairs of ring magnets, each of the magnets defining an axis perpendicular to the plane of the ring and passing through its center. Each magnet has a magnetic fied approximately axially symmetric about its axis. The magnets can resemble, for example, circular current loops. Each pair of magnets has a first ring magnet and a second ring magnet for representing a pair of electrons. The second ring magnet of each pair is detachably magnetically supportable by the first ring magnet with the axis of the two ring magnets being in substantial coaxial alignment. For example, the second ring magnet may have an inside diameter somewhat greater than the outside diameter of the first ring magnet. Such second ring magnet can be magnetically supported by the first ring magnet when placed radially outwardly of the first ring magnet in the plane of the first ring magnet and oriented so that the north pole of the second magnet is oriented toward the south pole of the first magnet.

The model further includes means for supporting the first ring magnets at predetermined positions and orientations with their axis passing through a spherical volume having a diameter substantially smaller than the diameters of the first ring magnets.

A feature of the model of the present invention is that representations of a wide variety of atomic and molecular forms can be built up from a relatively few different types of parts. These representations exhibit many of the expected structural features and symmetries of atoms and molecules even though the representations of electronic orbitals generally need not be interpenetrating.

A second feature is that the model of the present invention can represent electron pairing. Thus a number of atomic bonding effects such as covalent bonding can be readily illustrated.

The magnetization of the rings permits certain atomic and molecular magnetic effects to be demonstrated in addition to providing structural support for certain of the rings.

BRIEF DESCRIPTION OF THE DRAWINGS

Preferred embodiments of the invention are described below with reference to the following drawings.

FIGS. 5, 6, and 7 respectively depict models of water, fluorine, and cyclopropane molecules.

DETAILED DESCRIPTION OF THE PREFERRED EMBODIMENTS

Figure 1:
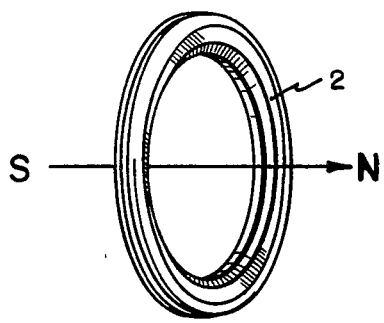
FIG. 1 illustrates a ring magnet of the present invention.

Referring now to FIG. 1 a ring magnet 2 is made of a magnet material and has a magnetic field approximately axially symmetric about an axis perpendicular to the plane of the ring and passing through its center. The preferred material for making the ring is magnetic plastic because of its low cost and light weight. However, other magnetic materials such as magnetic ceramics and metals can also be employed.

The ring magnet 2 corresponds to the orbital of a single electron. The orbital can be thought of as a circular standing wave of an interger number of wavelengths. In this model there is a correspondence between the number of wavelengths in an orbital and the quantum numbers of quantum mechanics. This relationship is described in detail in my eariler U.S. Pat. No. 3,276,148. In summary, all orbitals for which the azimuthal quantum number $l$ equals the principle quantum number minus one have a single wavelength. Orbitals, such as the $n=2$, $l=0$ orbital, for which the azimuthal quantum number $l$ equals the principle quantum number $n$ minus two have two wavelengths. In general it may be seen that the number of electronic wavelengths in an orbital equals the principle quantum number $n$ minus the azimuthal quantum number $l$.

Figure 2A:
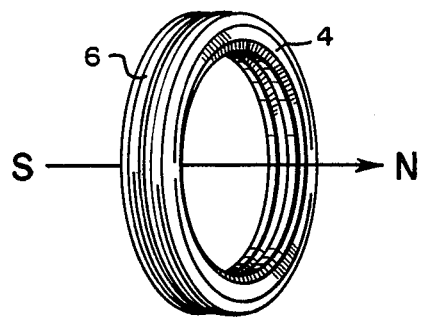
FIGS. 2A and 2B illustrates pairs of ring magnets for representing electron pairing.

A method by which the model of the present invention can depict the association of two electronic orbitals to represent electron pairing is shown in FIG. 2A. A first ring magnet 4 and a second ring magnet 6 have substantially the same diameter and are disposed in face-to-face contact with their axes in substantial coaxial alignment. The first and the second ring magnets 4 and 6 are oriented with respect to one another such that their magnetic fields are parellel. Thus the north pole of the first ring magnet 4 is oriented in the same direction as the north pole of the second ring magnet 6. The two ring magnets are thus magnetically attracted to one another.

Figure 2B:
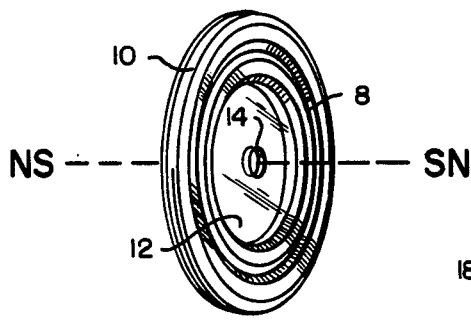

A second way by which circular electronic orbitals may be depicted as associating to form an electron pair is illustrated in FIG. 2B. There a second ring magnet 10 is positioned concentrically of a first ring magnet 8 with the axes of the first and second ring magnets 8 and 10 in substantial coaxial alignment. The inside diameter of the second ring magnet 10 exceeds the outside diameter of the first ring magnet 8 by an amount less than the thickness of either ring and the two ring magnets are substantially coplanar. The two ring magnets are oriented with their magnetic fields directed antiparallel to one another. Thus the north pole of the first ring magnet 8 is oriented in the direction of the south pole of the second ring magnet 10. In this arrangement the first and second ring magnets 8 and 10 are magnetically attracted to one another.

Since the magnetic fields of ring magnets 8 and 10 are antiparallel, the net magnetic dipole moment of the pair is substantially less than the dipole moment of the pair 4 and 6 of FIG. 2A. Thus the arrangement of FIG. 2A may be used appropriately to represent two-electron bonds which are paramagnetic, and the arrangement of FIG. 2B may be used to represent diamagnetic two-electron bonds.

Although the two ring magnets 8 and 10 of FIG. 2B have different diameters, they are to be regarded for the purposes of the model as representing the combination of two circular orbitals having equal numbers of electron wavelengths and the same energy.

A ring support disc 12 is disposed radially inwardly of the first ring magnet 8. It is preferred to attach the first ring magnet 8 to the ring-support disc 12 by means of a press fit, although an adhesive or other means securing the two can be employed. The ring-support disc 12 is preferably made of a transparent plastic material such as polymerized methylmethacrylate. Passing through the center of the ring support disc is a hole 14 for receiving a support rod, as described below.

Figure 3:
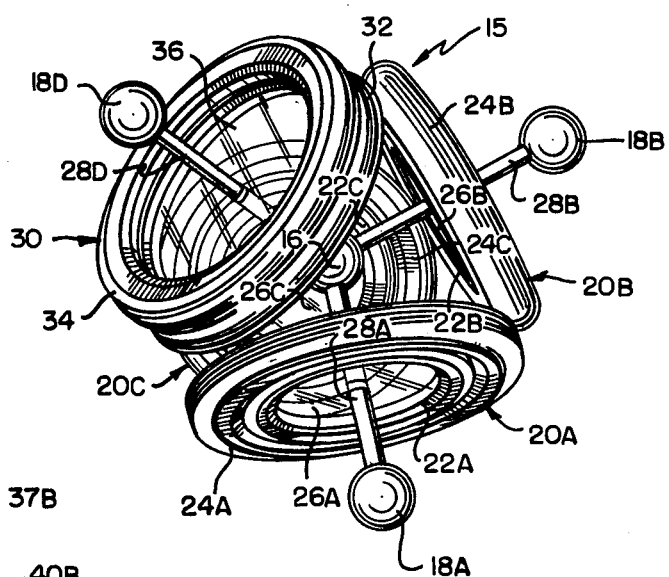
FIG. 3 depicts a model of a methane molecule.

Referring now to FIG. 3, a model 15 of a methane molecule is shown. A carbon-nucleus sphere 16 represents the carbon nucleus of the methane molecule and serves as a central support sphere for the model 15. Four hydrogen-nucleus spheres 18A-18D represent the nuclei of the four hydrogen atoms. The hydrogen-nucleus spheres 18 are positioned at the corners of a tetrahedron with the carbon nucleus sphere 16 located at its center. It is preferred to make the carbon-nucleus sphere 16 and the hydrogen-nucleus spheres 18 of different colors.

The electrons involved in the bonding of the four hydrogen atoms to the carbon nucleus are represented by four pairs of ring magnets 20A, 20B, 20C, and 30. Thus, for example, a first pair of ring magnets 20A includes a first ring magnet 22A and a second ring magnet 24A. The second ring magnet 24A is detachably magnetically supportable by the first ring magnet 22A with the second ring magnet 24A being disposed radially outwardly of the first ring magnet 22A in the manner of the pair of ring magnets of FIG. 2B. The axes of the first and second ring magnets 22A and 24A are in substantial coaxial alignment and pass through the carbon-nucleus sphere 16. Radially inward of the first ring magnet 22A is a ring support disc 26A to which the first ring magnet 22A is secured. The ring support disc 26A is in turn connected to a support rod 28A which extends along the axis of the first ring magnet 22A and is connected at one end to the carbon-nucleus sphere 16 and at the other to the hydrogen-nucleus sphere 18A. Thus the pair of ring magnets 20A represents the electron pair which bonds the hydrogen bond of the methane molecule.

Similarly, the two pairs of ring magnets 20B and 20C represent pairs of electrons bonding the hydrogen nuclei to the central carbon atom of methane. Each of the pairs of ring magnets 20B and 20C includes a first ring magnet 22 and a second ring magnet 24 detachably magnetically supportable by the first ring magnet 22 in the same manner as the pair of ring magnets 20A discussed above. Ring support discs 26B and 26C respectively support the first ring magnets 22B and 22C in positions and orientations such that their axes pass through the carbon-nucleus sphere 16. Each ring-support disc 26 is attached to a support rod 28 which extends between a hydrogen-nucleus sphere 18 and the carbon-nucleus sphere 16.

For purposes of illustraton, the pair of ring magnets 30 are shown to be in face-to-face contact with one another in the manner of the pair of ring magnets 4 and 6 of FIG. 2A. Thus the bond represented by the pair of ring magnets 30 can be viewed as representing an "excited-state" orbital arrangement which is paramagnetic, in contrast to the "ground-state" diamagnetic orbital arrangements represented by the pairs 20A-C.

Figure 4:
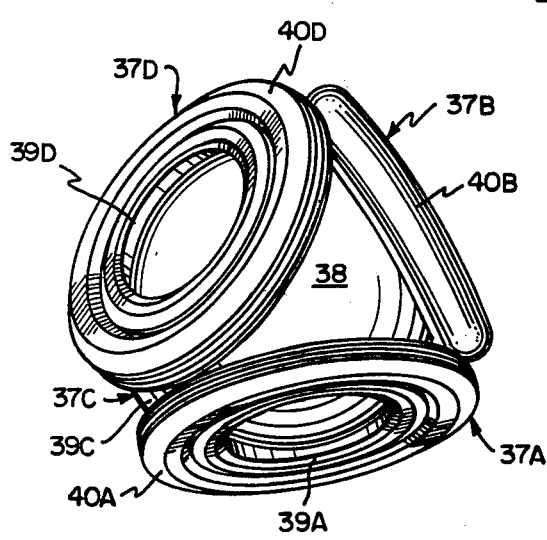
FIG. 4 illustrates a model of the bonding electrons in methane.

In FIG. 4 an alternate means for supporting four pairs of ring magnets in a tetrahedral arrangement is depicted. This model represents the bonding electrons in a methane molecule, the hydrogen and carbon nuclei not being shown. Four pairs of ring magnets 37A-37D are disposed about a surface-support sphere 38. Each pair 37 includes a first ring magnet 39 and a second ring magnet 40 detachably magnetically supported by the first. The surface-support sphere 38 represents an energy level of the electronic orbitals represented by the ring magnets 37. The greater the diameter of the surface-support sphere 38, the greater the energy represented by the energy level. The surface-support sphere 38 may be a hollow spherical shell made of a plastic such as poly(methylmethacrylate). The first ring magnets 39A-D are preferably attached to such a plastic surface-support sphere 38 by an adhesive. Alternatively, the surface-support sphere could be made of a ferromagnetic material to which the first ring magnets 39 could be attached by magnetic attraction.

An atom may be represented as having a number of energy levels corresponding to a series of concentric spheres centered about the atomic nucleus with ring magnets disposed on the spheres. Such an arrangement of electronic energy levels is disclosed in detail in my earlier U.S. Pat. No. 3,276,148. In FIGS. 3 and 4 only the outer electrons involved in bonding are shown for convenience. Thus, for example, in FIG. 3 the inner electrons of the carbon atom represented by the carbon-nucleus sphere 16 are not shown.

Referring now to FIG. 5 a model 41 of a water molecule is depicted. An oxygen-nucleus sphere 42 serves as a central support sphere for the molecular model. Attached to the oxygen-nucleus sphere 42 are first and second pairs support rods, 44A-B and 46A-B. The two first support rods 44A-B are also connected to hydrogen-nucleus spheres 48A-B for representing the two hydrogen nuclei of the water molecule. Since the hydrogen-nucleus spheres 48 represent a different element from the oxygen-nucleus sphere 42, it is preferred that the spheres 42 and 48 be of different colors. Attached to each first support rod 44 is a first ring-support disc 50. Secured to the perimeter of each first ring-support disc 50 is a first ring magnet 52, which in turn detachably magnetically supports a second ring magnet 54. Each pair of ring magnets 52 and 54 represents a pair of electrons bonding a hydrogen atom to the oxygen atom. Attached to the second support rods 46A and 46B, respectively, are second ring-support discs 56A and 56B. Secured to the outer perimeter of each second ring-support disc 56 is a first ring magnet 58, which in turn magnetically supports a second ring magnet 60. These four ring magnets 58A-B, 60A-B represent four nonbonding outer electrons of the oxygen atom.

The first ring magnets 52 are smaller in diameter than the first ring magnets 58 in order to depict an effect of the positive charge of the hydrogen nuclei represented by the spheres 48. In the view of the present model, the electrical attraction to the hydrogen nuclei of the electrons involved in the bonding of these nuclei can be represented as a contraction of the circular orbitals of the bonding electrons. The amount of the contraction of the radius of the orbitals is just sufficient to distort the angles between the first support rods 44A and 44B from the tetrahedral angle of 109° 28' to the angle measured for water, 104° 30'.

In FIG. 6 a model of a fluorine molecule 62 is shown as two tetrahedra sharing a pair of ring magnets 64 as a common face, the pair of ring magnets representing the pair of electrons which covalently bond the two fluorine atoms together. A first and a second fluorine-nucleus sphere 66 and 68 serve as central support spheres for the two tetrahedra. Thus four pairs of ring magnets 64, 70, 72, and 74 are disposed in a tetrahedral array about the first fluorine-nucleus sphere 56. Similarly, four pairs of ring magnets 64, 76, 78, and 80 are disposed about the second fluorine-nucleus sphere 68. The two fluorine-nucleus spheres 66 and 68 are connected by a support rod 82 to which is attached a ring-support disc 84 which supports the shared pair of ring magnets 64. The six remaining pairs of ring magnets 70, 72, 74, 76, 78, and 80 are supported by support rods and ring-support discs in the manner described for the model of a methane molecule in FIG. 3.

FIG. 7 illustrates a model of a cyclopropane molecule 86 which includes three distorted tetrahedra 88A-C of pairs of ring magnets. Each of the three distorted tetrahedra 88 shares a common base with the other two. Thus, for example, the pair of ring magnets 90 is common to the distorted tetrahedron 88A and to the distorted tetrahedron 88C. Each of the distorted tetrahedra 88 has a carbon-nucleus sphere 92 positioned at its center. Support rods 94, 96, and 98 are connected between the three carbon-nucleus spheres 92A-C. In addition, each carbon-nucleus sphere 92 is connected to a pair of support rods 100 and 102 to which are connected hydrogen-nucleus spheres 106 and 108. The support rods 102 and 104 support the pair of ring magnets forming the other faces of the tetrahedra. To each carbon-nucleus sphere 92 four support rods are joined oriented to make the tetrahedral angles with respect to one another. The ring support rods 94, 96, and 98 must be bowed to account for the distortion caused by joining the three tetrahedra.

The above description includes a number of examples of models and the manner in which they may be assembled and used to represent various atomic and molecular forms. It is to be understood, however, that various changes may be made without departing from the spirit of the invention as set forth in the following claims.

I claim:

1. A model for atomic comprising:
   (a) a plurality of pairs of ring magnets, each of the ring magnets defining an axis perpendicular to the plane of the ring and passing through its center and having a magnetic field approximately axially symmetric about said axis, each pair of magnets having a first ring magnet and a second ring magnet for representing a pair of electrons, the second ring magnet of each pair being detachably magnetically supportable by the first ring magnet with the axes of said first and second ring magnets in substantial coaxial alignment; and
   (b) means for supporting the first ring magnets at predetermined positions and orientations with their axes passing through a spherical volume having a diameter substantially smaller than the diameters of the first ring magnets.

2. The model for atomic forms according to claim 1 in which the axes of the first ring magnets intersect at a point.

3. The model for atomic forms according to claim 1 in which the inside diameter of the second ring magnet in each pair exceeds the outside diameter of the first ring magnet by an amount less than the thickness of either ring magnet, the second ring magnet of each pair being detachably magnetically supportable by the first ring magnet of the pair with the second ring magnet positioned radially outwardly of the first ring magnet and with the axes of said first and second ring magnets in substantial coaxial alignment.

4. The model for atomic forms according to claim 1 in which the diameter of the second ring magnet of a first pair substantially equals the diameter of the first ring magnet of the first pair, said second magnet being detachably magnetically supportable by the first ring magnet in face-to-face contact with the axes of said first and second ring magnets in substantial coaxial alignment.

5. The model for atomic forms according to claim 1 in which the means for supporting the first ring magnets includes a surface-support sphere for representing an energy level, the first ring magnets being secured to the radially-outward surface of the surface-support sphere with the axes of the first ring magnets passing through the center of the surface-support sphere.

6. The model for atomic forms according to claim 1 in which the surface-support sphere is a hollow spherical shell made of a transparent material, the first ring magnets being secured to the outward surface of the surface-support sphere by an adhesive.

7. The model for atomic forms according to claim 5 in which the surface-support sphere is a hollow spherical shell made of a ferromagnetic material, the first ring magnets being detachably magnetically secured to the radially outward surface of the surface-support sphere.

8. The model for atomic forms according to claim 1 in which the means for supporting the first ring magnets includes:
   (b.1) a plurality of ring-support disks, each disk being positioned concentric of a first ring magnet, the ring magnet being attached to the ring-support disk around the perimeter of the disk;
   (b.2) a central-support sphere for representing an atomic nucleus, the diameter of the central-support sphere being substantially smaller than the diameter of the first ring magnets; and
   (b.3) a plurality of support rods, each support rod being connected between the central-support sphere and the center of a ring-support disk and extending along the axis of the first ring magnet to which the ring-support disk is attached.

* * * * *

UNITED STATES PATENT AND TRADEMARK OFFICE
CERTIFICATE OF CORRECTION

PATENT NO. : 4,099,339

DATED : July 11, 1978

INVENTOR(S) : Kenneth Snelson

It is certified that error appears in the above-identified patent and that said Letters Patent are hereby corrected as shown below:

Column 2, line 51, "fied" should read --field--.

Column 7, line 6, "atomic comprising" should read --atomic forms comprising--.

Signed and Sealed this

Ninth Day of January 1979

[SEAL]

Attest:

RUTH C. MASON
Attesting Officer

DONALD W. BANNER
Commissioner of Patents and Trademarks